(12) United States Patent
Swoboda et al.

(10) Patent No.: US 10,294,165 B2
(45) Date of Patent: *May 21, 2019

(54) FLEXIBLE COMPOSITE AEROGEL AND PROCESS FOR PRODUCING SAME

(71) Applicant: HUTCHINSON, Paris (FR)

(72) Inventors: Benjamin Swoboda, Bois le Roi (FR); Cedric Huillet, Montargis (FR); Philippe Sonntag, Avon (FR); Arthur Van Eibergen, Montargis (FR)

(73) Assignee: HUTCHINSON, Paris (FR)

( * ) Notice: Subject to any disclaimer, the term of this patent is extended or adjusted under 35 U.S.C. 154(b) by 138 days.

This patent is subject to a terminal disclaimer.

(21) Appl. No.: 15/118,380

(22) PCT Filed: Feb. 12, 2014

(86) PCT No.: PCT/FR2014/050268
§ 371 (c)(1),
(2) Date: Aug. 11, 2016

(87) PCT Pub. No.: WO2015/121541
PCT Pub. Date: Aug. 20, 2015

(65) Prior Publication Data
US 2017/0174576 A1 Jun. 22, 2017

(51) Int. Cl.
*C08J 9/28* (2006.01)
*C01B 32/00* (2017.01)
(Continued)

(52) U.S. Cl.
CPC .......... *C04B 38/0045* (2013.01); *C01B 32/00* (2017.08); *C04B 35/806* (2013.01);
(Continued)

(58) Field of Classification Search
CPC .............................. C04B 38/0045; C08J 9/28
See application file for complete search history.

(56) References Cited

U.S. PATENT DOCUMENTS 5,744,510 A    4/1998    Pekala
6,087,407 A    11/2000    Coronado et al.
(Continued)

FOREIGN PATENT DOCUMENTS

CN    101910058 A    12/2010
CN    102276235 A    12/2011
(Continued)

OTHER PUBLICATIONS

Translation of CN 10 2285775, Zhang et al., Sep. 25, 2013, p. 1-8. (Year: 2013).*

(Continued)

*Primary Examiner* — Hai Vo
(74) *Attorney, Agent, or Firm* — Oblon, McClelland, Maier & Neustadt, L.L.P.

(57) ABSTRACT

The present invention relates to a flexible composite organic aerogel (1) comprising:
a textile reinforcement (5),
an organic aerogel (3) placed within said textile reinforcement (3),
said organic aerogel (3) being based on a resin resulting at least in part from polyhydroxybenzene(s) R and formaldehyde(s) F,
said organic aerogel (3) being a polymeric organic gel comprising at least one water-soluble cationic polyelectrolyte,
or said organic aerogel (3) being a pyrolysate of said gel in the form of a porous carbon monolith comprising the product of the pyrolysis of said at least one water-soluble cationic polyelectrolyte P,
said organic aerogel (3) exhibiting a specific thermal conductivity of between 10 and 40 mW·m$^{-1}$·K$^{-1}$ at atmospheric pressure.

16 Claims, 1 Drawing Sheet

Figure 1:
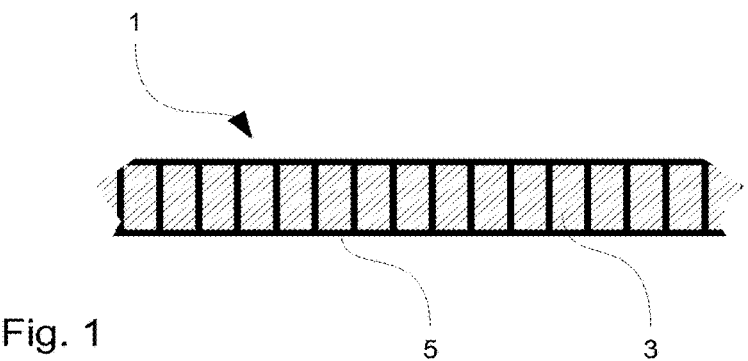

(51) Int. Cl.

| | | |
|---|---|---|
| *C04B 35/52* | (2006.01) | |
| *C04B 35/80* | (2006.01) | |
| *C04B 35/83* | (2006.01) | |
| *C04B 38/00* | (2006.01) | |
| *C04B 111/00* | (2006.01) | |
| *C04B 111/28* | (2006.01) | |

(52) U.S. Cl.
CPC .......... *C04B 35/83* (2013.01); *C04B 38/0032* (2013.01); *C08J 9/28* (2013.01); *C04B 2111/00612* (2013.01); *C04B 2111/28* (2013.01); *C04B 2235/422* (2013.01); *C04B 2235/48* (2013.01); *C04B 2235/5252* (2013.01); *C04B 2235/9607* (2013.01); *C08J 2361/12* (2013.01)

(56) References Cited

U.S. PATENT DOCUMENTS

| | | | |
|---|---|---|---|
| 2005/0046086 A1* | 3/2005 | Lee | B01J 13/0091 264/444 |
| 2007/0154698 A1 | 7/2007 | Stepanian | |
| 2010/0288160 A1 | 11/2010 | Maisels et al. | |
| 2012/0238174 A1* | 9/2012 | Bullock | B32B 5/245 442/374 |

FOREIGN PATENT DOCUMENTS

| | | |
|---|---|---|
| CN | 102285775 A | 12/2011 |
| CN | 102285775 B * | 9/2013 |
| CN | 102285775 B | 9/2013 |
| EP | 2 080 736 A1 | 7/2009 |
| WO | WO 94/22943 A1 | 10/1994 |
| WO | WO 99/38610 A1 | 8/1999 |

OTHER PUBLICATIONS

Balach et al., "Facile preparation of hierarchical porous carbons with tailored pore size obtained using a cationic polyelectrolyte as a soft template", Colloids and Surfaces A: Physicochemical and Engineering Aspects 415 (2012) 343-348 (Year: 2012).*

Bruno et al., "Hierarchical porous materials: Capillaries in nanoporous carbon", Functional Materials Letters, vol. 2, No. 3 (2009) 135-138. (Year: 2009).*

Chinese Office Action dated Jan. 3, 2018 in Patent Application No. 201480077931.X (with English translation), 17 pages.

Mariano M. Bruno, et al., "A Novel Way to Maintain Resorcinol-Formaldehyde Porosity During Drying: Stabilization of the Sol-Gel Nanostructure Using a Cationic Polyelectrolyte" Colloids and Surfaces A: Physicochemical and Engineering Aspects, Elsevier, XP27046589, Mar. 27, 2010, pp. 28-32.

International Search Report and Written Opinion dated Nov. 12, 2014 in PCT/FR2014/050268 (with English translation).

Mariano M. Bruno, et al., "A novel way to maintain resorcinol-formaldehyde porosity during drying: Stabilization of the sol-gel nanostructure using a cationic polyelectrolyte", Colloids and Surfaces A: Physicochemical and Engineering Aspects, vol. 362, XP027046589, 2010, pp. 28-32.

R.W. Pekala, et al., "New organic aerogels based upon a phenolic-furfural reaction", Journal of Non-Crystalline Solids, vol. 188, XP004067973, 1995, pp. 34-40.

M. Glora, et al., "Integration of carbon aerogels in PEM fuel cells", Journal of Non-Crystalline Solids, vol. 285, XP004242936, 2001, pp. 283-287.

Marina Schwan, et al., "Journal of Materials Chemistry A", vol. 1, XP055149881, 2013, pp. 13462-13468.

M.M. Bruno, et al., "Characterization of monolithic porous carbon prepared from resorcinol/formaldehyde gels with cationic surfactant", Colloids and Surfaces A: Physicochemical and Engineering Aspects, vol. 358, XP026917493, 2010, pp. 13-20.

* cited by examiner

FLEXIBLE COMPOSITE AEROGEL AND PROCESS FOR PRODUCING SAME

The present invention relates to the field of thermal insulation and more particularly the field of flexible composite aerogels and to their manufacturing process.

Aerogels are increasingly used in the field of thermal insulation as a result of their very low thermal conductivity. It is thus known to use organic or inorganic aerogels as core material in vacuum insulating boards.

Nevertheless, aerogels in monolithic form are rigid and relatively weak. Thus, these aerogels may not be suitable for uses where flexibility and a degree of strength are necessary.

In order to confer these characteristics of strength and flexibility, it is thus known to manufacture flexible composite aerogels composed of an organic or inorganic aerogel within a textile reinforcement.

However, the aerogels used in the prior art are aerogels having a high production cost and which are difficult to manufacture as they require a stage of drying with supercritical $CO_2$ which is lengthy and expensive.

One of the aims of the present invention is thus to at least partially overcome the disadvantages of the prior art and to provide a flexible composite aerogel having a low cost price, the thermal conductivity of which is between 1 and 40 $mW \cdot m^{-1} \cdot K^{-1}$.

The present invention relates to a flexible composite organic aerogel comprising:
- a textile reinforcement,
- an organic aerogel placed within said textile reinforcement, said organic aerogel being based on a resin resulting at least in part from polyhydroxybenzene(s) R and formaldehyde(s) F,
said organic aerogel being a polymeric organic gel comprising at least one water-soluble cationic polyelectrolyte,
or said organic aerogel being a pyrolysate of said gel in the form of a porous carbon monolith comprising the product of the pyrolysis of said at least one water-soluble cationic polyelectrolyte P,
said organic aerogel exhibiting a specific thermal conductivity of between 10 and 40 $mW \cdot m^{-1} \cdot K^{-1}$ at atmospheric pressure.

According to one aspect of the invention, said at least one water-soluble cationic polyelectrolyte P is an organic polymer chosen from the group consisting of quaternary ammonium salts, poly(vinylpyridinium chloride), polyethyleneimine, polyvinylpyridine, poly(allylamine hydrochloride), poly(trimethylammonioethyl methacrylate chloride), poly(acrylamide-co-dimethylammonium chloride) and their mixtures.

According to another aspect of the invention, said at least one water-soluble cationic polyelectrolyte P is a salt comprising units resulting from a quaternary ammonium chosen from poly(diallyldimethylammonium halide) and is preferably poly(diallyldimethylammonium chloride) or poly(diallyldimethylammonium bromide).

According to another aspect of the invention, the organic aerogel comprises the product of a polymerization reaction in an aqueous solvent W of the polyhydroxybenzene(s) R and formaldehyde(s) F, in the presence of the at least one water-soluble cationic polyelectrolyte P dissolved in said aqueous solvent and of a catalyst.

According to another aspect of the invention, said product of the polymerization reaction comprises said at least one water-soluble cationic polyelectrolyte P according to a mass fraction of between 0.2% and 2%.

According to another aspect of the invention, said product of the polymerization reaction comprises said at least one water-soluble cationic polyelectrolyte P according to a P/(R+F) ratio by weight, with respect to said polyhydroxybenzene(s) R and formaldehyde(s) F, which is between 2% and 10%.

According to another aspect of the invention, said product of the polymerization reaction comprises said at least one water-soluble cationic polyelectrolyte P according to a P/(R+F+W) ratio by weight, with respect to said polyhydroxybenzene(s) R, formaldehyde(s) F and aqueous solvent W, which is between 0.3% and 2%.

According to another aspect of the invention, the organic aerogel exhibits:
- a specific surface of between 400 $m^2/g$ and 1200 $m^2/g$, and/or
- a pore volume of between 0.1 $cm^3/g$ and 3 $cm^3/g$, and/or
- a mean pore diameter of between 3 nm and 30 nm, and/or
- a density of between 0.01 and 0.4.

According to another aspect of the invention, when the organic aerogel is a polymeric organic gel comprising at least one water-soluble cationic polyelectrolyte P, the textile reinforcement is produced by means of organic fibers or filaments having a moisture uptake content of greater than or equal to 5% and having a good chemical affinity for said organic aerogel.

According to another aspect of the invention, the organic fibers or filaments of the textile reinforcement 5 are chosen from the following materials:
- meta-aramid fiber,
- oxidized polyacrylonitrile fiber,
- polyamide-imide fiber,
- phenolic fiber,
- polybenzimidazole fiber,
- polysulfonamide fiber.

According to another aspect of the invention, when the organic aerogel is a pyrolysate in the form of a porous carbon monolith comprising the product of the pyrolysis of said at least one water-soluble cationic polyelectrolyte P, the textile reinforcement is produced by means of inorganic fibers or filaments which are resistant to the pyrolysis temperature.

According to another aspect of the invention, the inorganic fibers or filaments of the textile reinforcement 5 are chosen from the following materials:
- glass fiber,
- basalt fiber,
- ceramic fiber,
- silica fiber,
- silicon carbide fiber.

According to another aspect of the invention, the textile reinforcement is a nonwoven textile.

According to another aspect of the invention, the textile reinforcement is a woven or knitted textile.

According to another aspect of the invention, the textile reinforcement is a textile in three dimensions.

The present invention also relates to a process for the manufacture of a flexible composite organic aerogel comprising the following stages:
a) polymerization in an aqueous solvent W of polyhydroxybenzene(s) R and formaldehyde(s) F, in the presence of at least one cationic polyelectrolyte P dissolved in said aqueous solvent W and of a catalyst, within a textile reinforcement,
b) gelling of the solution obtained in a) within the textile reinforcement in order to obtain a gel, c) drying of the textile reinforcement impregnated with the gel obtained in b).

According to one aspect of the process according to the invention, the process comprises an additional stage of pyrolysis of the dried gel obtained in c), in order to obtain a porous carbon.

According to another aspect of the process according to the invention, stage a) is carried out by using said at least one water-soluble cationic polyelectrolyte P:
- according to a mass fraction in the composition of between 0.2% and 2%, and/or
- according to a P/(R+F) ratio by weight, with respect to said polyhydroxybenzene(s) R and formaldehyde(s) F, of between 2% and 10%, and/or
- according to a P/(R+F+W) ratio by weight, with respect to said polyhydroxybenzene(s) R, formaldehyde(s) F and aqueous solvent W, of between 0.3% and 2%.

According to another aspect of the process according to the invention:
- stage a) is carried out at ambient temperature, by dissolving said polyhydroxybenzene(s) R and said at least one water-soluble cationic polyelectrolyte P in said aqueous solvent W, preferably composed of water, and by then adding, to the solution obtained, said formaldehyde(s) F and said acidic or basic catalyst, before pouring the solution obtained over the textile reinforcement, and
- stage b) is carried out by curing said impregnated textile reinforcement in an oven.

According to another aspect of the process according to the invention, stage c) is carried out by drying with air, for example in a stove in order to obtain said polymeric organic gel exhibiting:
- a specific surface of between 400 m²/g and 1200 m²/g, and/or
- a pore volume of between 0.1 cm³/g and 3 cm³/g, and/or
- a mean pore diameter of between 3 nm and 30 nm, and/or
- a density of between 0.01 and 0.4.

Figure 2:

Other characteristics and advantages of the invention will become more clearly apparent on reading the following description, given as illustrative and nonlimiting example, and the appended drawings, among which:

FIG. 1 shows a diagrammatic representation in cutaway side-face view of a flexible composite organic aerogel, FIG. 2 shows a photograph in sight-face view of a textile reinforcement in three dimensions.

Identical components in the different figures carry the same references.

As illustrated in FIG. 1, the flexible composite organic aerogel 1 comprises in particular a textile reinforcement 5 and an organic aerogel 3 within said textile reinforcement 5.

Said organic aerogel 3 can in particular be a polymeric organic gel or a pyrolysate of said gel in the form of a thermal superinsulating porous carbon monolith (i.e., with a thermal conductivity of less than or equal to 40 mW·m$^{-1}$·K$^{-1}$).

This organic aerogel 3 is obtained by the fact that the applicant company has just discovered, surprisingly, that the addition in the aqueous phase, to precursors of a resin of polyhydroxybenzene and of formaldehyde type, of a specific family of additives consisting of a water-soluble cationic polyelectrolyte makes it possible to obtain a gel or its pyrolysate which simultaneously exhibits a high specific surface, a very low density and a high pore volume, while being able to manage without drying by solvent exchange and by a supercritical fluid.

To this end, the organic aerogel 3 is based on a resin resulting at least in part from polyhydroxybenzene(s) R and from formaldehyde(s) F, is such that it comprises at least one water-soluble cationic polyelectrolyte P.

It should be noted that this aerogel incorporating this cationic polyelectrolyte can advantageously be obtained by using a stove drying which is much simpler to carry out and which is less damaging to the cost of production of the gel than drying by supercritical $CO_2$. This is because the applicant company has discovered that this additive makes it possible to retain the high porosity of the gel obtained subsequent to this stove drying and to confer on it a very low density combined with a high specific surface and a high pore volume.

The term "gel" is understood to mean, in a known way, the mixture of a colloidal material and of a liquid which is formed spontaneously or under the action of a catalyst by the flocculation and coagulation of a colloidal solution.

The term "water-soluble polymer" is understood to mean a polymer which can be dissolved in water without addition of additives (in particular of surfactants), unlike a water-dispersible polymer which is capable of forming a dispersion when it is mixed with water.

The organic aerogel 3 can also comprise the product of a polymerization reaction in an aqueous solvent W of said polyhydroxybenzene(s) R and formaldehyde(s) F, in the presence of said at least one cationic polyelectrolyte P dissolved in this solvent and of an acidic or basic catalyst.

Advantageously, said product of the polymerization reaction can comprise:
- said at least one cationic polyelectrolyte P according to a greatly reduced mass fraction which is between 0.2% and 2% and preferably between 0.3% and 1%, and/or
- said at least one cationic polyelectrolyte P according to a P/(R+F) ratio by weight, with respect to said polyhydroxybenzene(s) R and formaldehyde(s) F, which is between 2% and 10% and preferably between 3% and 7%, and/or
- said at least one cationic polyelectrolyte P according to a P/(R+F+W) ratio by weight, with respect to said polyhydroxybenzene(s) R, formaldehyde(s) F and aqueous solvent W, which is between 0.3% and 2% and preferably between OA % and 1.5%.

Said at least one polyelectrolyte can be any cationic polyelectrolyte which is completely soluble in water and with a low ionic strength.

Preferably, it is an organic polymer chosen from the group consisting of quaternary ammonium salts, poly(vinylpyridinium chloride), polyethyleneimine, polyvinylpyridine, poly(allylamine hydrochloride), poly(trimethylammonioethyl methacrylate chloride), poly(acrylamide-co-dimethylammonium chloride) and their mixtures.

More preferably still, said at least one water-soluble cationic polyelectrolyte is a salt comprising units resulting from a quaternary ammonium chosen from poly(diallyldimethylammonium halide) and is preferably poly(diallyldimethylammonium chloride) or poly(diallyldimethylammonium bromide).

Mention may be made, among the precursor polymers of said resin which can be used in the present invention, of the polymers resulting from the polycondensation of at least one monomer of the polyhydroxybenzene type and of at least one formaldehyde monomer. This polymerization reaction can involve more than two distinct monomers, the additional monomers being or not being of the polyhydroxybenzene type. The polyhydroxybenzenes which can be used are preferably di- or trihydroxybenzenes and advantageously resorcinol (1,3-dihydroxybenzene) or the mixture of resorcinol with another compound chosen from catechol, hydroquinone or phloroglucinol.

The polyhydroxybenzene(s) R and formaldehyde(s) F may be used, for example, according to an R/F molar ratio of between 0.2 and 1.

The organic aerogel 3 can advantageously exhibit a specific surface of between 400 m$^2$/g and 1200 m$^2$/g, and/or a pore volume of between 0.1 cm$^3$/g and 3 cm$^3$/g, and/or a mean pore diameter of between 3 nm and 30 nm, and/or a density of between 0.01 and 0.4.

Advantageously, the organic aerogel 3 can exhibit a thermal conductivity of between 10 mW·m$^{-1}$·K$^{-1}$ and 40 mW·m$^{-1}$·K$^{-1}$ and for example of between 12 and 35 mW·m$^{-1}$·K$^{-1}$ at atmospheric pressure.

For its part, the textile reinforcement 5 can be a nonwoven textile or can be a woven or knitted textile and preferably a nonwoven, woven or knitted textile in three dimensions, such as, for example, a woven or knitwear in three dimensions, as represented in FIGS. 1 and 2.

The term "textile in three dimensions" is understood to mean a textile which exhibits a third dimension with respect to the other two normal planar dimensions. This textile can be produced by weaving, knitting (warp or weft), stitching, braiding or also by a combination of these techniques.

The use of such textile reinforcements 5 contributes the flexible nature to the flexible composite organic aerogel 1.

The choice of the material from which the textile reinforcement 5 is made depends on the conditions of use of the flexible composite organic aerogel 1 and on the nature of the organic aerogel 3.

This is because, in the case where the organic aerogel 3 within the textile reinforcement 5 is a polymeric organic gel as described above, it will preferably be used at temperatures of less than or equal to 200° C. Thus, the textile reinforcement 5 can be produced using organic fibers or filaments having a moisture uptake content of greater than or equal to 5% (determined under the conditions of the standard ISO 3344). The fact that these fibers or filaments have a high moisture uptake makes possible a high wettability (and thus impregnation) of the solution on the textile reinforcement. Furthermore, the organic fibers or filaments are preferably chosen in order to have a good chemical affinity for the polymeric organic gel (polyhydroxybenzene(s) R and formaldehyde(s) F); thus, a chemical reaction takes place between a small portion of the R and F reactants during the gelling. This phenomenon makes it possible to have significant adhesion between the textile reinforcement 5 and the final aerogel 3 and thus limits the loss of gel by dusting during bending.

The organic fibers or filaments of the textile reinforcement 5 can thus be chosen from the following materials:
- meta-aramid fiber,
- oxidized polyacrylonitrile fiber,
- polyamide-imide fiber,
- phenolic fiber,
- polybenzimidazole fiber,
- polysulfonamide fiber.

In the case where the organic aerogel 3 within the textile reinforcement 5 is a pyrolysate of the gel in the form of a porous carbon monolith as described above, it will preferably be used at temperatures of less than or equal to 400° C. Nevertheless, the textile reinforcement 5 must be produced using inorganic fibers or filaments which are resistant to the pyrolysis temperature, which in this instance is of the order of 800° C.

The inorganic fibers or filaments of the textile reinforcement 5 can thus be chosen from the following materials:
- glass fiber,
- basalt fiber,
- ceramic fiber (for example alumina, aluminosilicate, borosilicoaluminate),
- silica fiber,
- silicon carbide fiber.

According to a preferred embodiment, the textile reinforcement 5 is a nonwoven, woven or knitted textile in three dimensions, such as, for example, a woven or knitwear in three dimensions as illustrated in FIG. 2. The advantage of this type of textile is to provide a textile with a certain thickness which has better mechanical properties than a simple nonwoven textile needled to equivalent material and which makes it possible to obtain a flexible composite organic aerogel which can be handled with little in the way of aerogel losses by dusting.

This very particularly makes it possible, in the case of inorganic fibers or filaments, to prevent an excessively marked loss by dusting despite the low wettability of the fibers or filaments. The textile in three dimensions is then used "as covering" in the organic aerogel.

Test Carried Out Between a Nonwoven Textile Reinforcement 5 and a 3D Knitwear:

Nonwoven Airtech: Airweave® UHT 800
Needled Nonwoven Manufactured from Glass Fibers:
  Weight per m$^2$ measured: 636.3 g/m$^2$
  Thickness 5 mm
  Density: 127.26 kg/m$^3$
3D "Warp" Knitwear Manufactured from Glass Fibers:
  Weight per m$^2$ measured: 1059 g/m$^2$
  Thickness 5 mm
  Density: 211.84 kg/m$^3$
Tensile Test on 3D Knitwear/Nonwoven:

| Nonwoven glass fibers Initial state | Results | Max. force (N) | Elongation at F Max. (%) |
|---|---|---|---|
| Production direction | Mean | 49.58 | 38.63 |
|  | Standard deviation | 2.84 | 1.78 |
| Transverse direction | Mean | 26.74 | 20.83 |
|  | Standard deviation | 2.65 | 3.42 |

| 3D Knitwear Initial state | Results | Max. force (N) | Elongation at F Max. (%) |
|---|---|---|---|
| Column direction | Mean | 236.60 | 32.63 |
|  | Standard deviation | 20.70 | 0.48 |
| Row direction | Mean | 165.80 | 62.53 |
|  | Standard deviation | / | / |

By way of comparison, better deformation and strength properties are noted with the 3D knitwear, in comparison with the nonwoven, owing to the fact that the 3D knitwear has a better elasticity in the direction of its rows owing to the fact that it is composed of stitches.

The present invention also relates to a process for the manufacture of a flexible composite organic aerogel 1 comprising the following stages:
  a) polymerization in an aqueous solvent W of polyhydroxybenzene(s) R and formaldehyde(s) F, in the presence of at least one cationic polyelectrolyte P dissolved in said aqueous solvent W and of a catalyst, within a textile reinforcement 5, b) gelling of the solution obtained in a) within the textile reinforcement 5 in order to obtain a gel, c) drying of the textile reinforcement 5 impregnated with the gel obtained in b).

A flexible composite organic aerogel 1 is then obtained, the organic aerogel 3 of which is in the form of a polymeric organic gel.

The preparation of the flexible composite organic aerogel 1 can also comprise an additional stage d) of pyrolysis of the dried gel obtained in c), in order to obtain a porous carbon.

A flexible composite organic aerogel 1 is then obtained, the organic aerogel 3 of which is in the form of a porous carbon.

Advantageously and as indicated above, stage a) can be carried out by using said at least one polyelectrolyte P according to a mass fraction in the composition of between 0.2% and 2%, and/or according to a P/(R+F) ratio by weight of between 2% and 10%, and/or according to a P/(R+F+W) ratio by weight of between 0.3% and 2%.

Also advantageously:

stage a) can be carried out at ambient temperature, by dissolving said polyhydroxybenzene(s) R and said at least one cationic polyelectrolyte P in said aqueous solvent, preferably composed of water, and by then adding, to the solution obtained, said formaldehyde(s) F and said catalysts, which can be acidic or basic, before pouring the solution obtained over a textile reinforcement, as described above, and then stage b) can be carried out by curing said impregnated textile reinforcement in an oven.

Mention may be made, as catalyst which can be used in stage a), for example, of acidic catalysts, such as aqueous solutions of hydrochloric, sulfuric, nitric, acetic, phosphoric, trifluoroacetic, trifluoromethanesulfonic, perchloric, oxalic, toluenesulfonic, dichloroacetic or formic acid, or else of basic catalysts, such as sodium carbonate, sodium hydrogencarbonate, potassium carbonate, ammonium carbonate, lithium carbonate, ammonium hydroxide, potassium hydroxide and sodium hydroxide.

Use may be made, for example, in stage a), of an R/W ratio by weight of polyhydroxybenzene(s) to water of between 0.001 and 0.3.

Preferably, stage c) is carried out by drying with air, for example in a stove, without solvent exchange or drying by a supercritical fluid, in order to obtain said polymeric organic gel which exhibits (according to the conditions of synthesis and in particular the pH) a specific surface of between 400 $m^2/g$ and 1200 $m^2/g$, and/or a pore volume of between 0.1 $cm^3/g$ and 3 $cm^3/g$, and/or a mean pore diameter of between 3 nm and 30 nm, and/or a density of between 0.01 and 0.4.

It should be noted that this aqueous-phase preparation process according to the invention thus makes it possible to obtain controlled porous structures which vary according to the conditions of synthesis. It is thus possible to obtain a structure of low, solely nanopore, density (i.e., with a pore diameter of less than 50 nm) or else with coexistence between nano- and macropores (i.e., with a pore diameter of greater than 50 nm).

Other characteristics, advantages and details will emerge on reading the following description of several implementational examples of the invention, given by way of illustration and without implied limitation.

Examples of the Preparation of the Organic Aerogel 3:

The examples which follow illustrate the preparation of two "control" organic gels G0 and G0' and of five organic gels according to the invention G1 to G5 and of the corresponding "control" porous carbons C0 and C0' and the porous carbons according to the invention C1 to C5, with the starting reactants:

resorcinol (R) from Acros Organics®, 98% pure, formaldehyde (F) from Acros Organics®, 37% pure, a catalyst (C) composed of hydrochloric acid for the G1 to G4 gels and of sodium carbonate for the G5 gel, and poly(diallyldimethylammonium chloride) (P), 35% pure (in solution in water W), for the G1 to G5 gels.

These G0, G0' and G1 to G5 gels were prepared as follows:

In a first step, the resorcinol R and the polyelectrolyte P (with the exception of the G0 and G0' gels) were dissolved in a container containing water. Then, after complete dissolution, the formaldehyde F was added. The polymeric solution obtained was adjusted to the appropriate pH with the catalyst C, it being specified that all of these operations were carried out at ambient temperature (approximately 22° C.). In a second step, the solution obtained was poured into Teflon molds which were subsequently placed in an oven at 90° C. for 24 h in order to carry out the gelling.

The gel was subsequently dried:

in a humid chamber at 85° C. with a moisture content of 90% for 17 hours, in order to obtain the G0', G2, G4 and G5 gels, or with supercritical $CO_2$ after solvent exchange in a trifluoroacetic acid bath for 3 clays and then in an absolute ethanol bath for 4 days, in order to obtain the G0, G1 and G3 aerogels.

Finally, the G0, G0' and G1 to G5 organic gels were pyrolyzed under nitrogen at a temperature of 800° C. in order to obtain the C0, C0' and C1 to C5 porous carbons.

In table 1 below:

R/F is the molar ratio of resorcinol to formaldehyde,

R/W is the molar ratio of resorcinol to water,

P denotes the mass fraction of polyelectrolyte,

P/(R+F) is the ratio by weight of the polyelectrolyte to the resorcinol-formaldehyde precursors, P/(R+F+W) is the ratio by weight of the polyelectrolyte to the resorcinol-formaldehyde precursors to which water has been added, and $CO_2$ sc denotes drying using supercritical $CO_2$, in contrast to the stove drying which can be used according to the invention.

The thermal conductivities of the G0, G2 and G4 gels (see table 2) and of the C0, C2 and C4 porous carbons (see table 3) were measured at 22° C. with a NeoTim® conductivity meter according to the hot wire technique, and the mechanical properties in three-point compression and in tension of the G4 gel and of the corresponding C4 porous carbon were measured in comparison with those of a "control" silica aerogel G0" (see table 4) with an MTS tensile/compression testing machine according to the standard ASTM C165-07.

For each C0, C0' and C1 to C5 porous carbon, the specific surfaces, the pore volumes and the mean pore diameters were measured (table 2) using the Tristar 3020 device from Micromeritics.

TABLE 1

| Amounts of reactants/process | G0 | G0' | G1 | G2 | G3 | G4 | G5 |
|---|---|---|---|---|---|---|---|
| R/F | 0.5 | 0.5 | 0.5 | 0.5 | 0.5 | 0.5 | 0.5 |
| R/W | 0.03 | 0.03 | 0.03 | 0.03 | 0.03 | 0.03 | 0.20 |
| P | 0 | 0 | 0.4% | 0.4% | 0.4% | 0.4% | — |
| P/(R + F) | 0 | 0 | 0.0626 | 0.0626 | 0.0640 | 0.0640 | 0.0379 |
| P/(R + F + W) | 0 | 0 | 0.0044 | 0.0044 | 0.0070 | 0.0070 | 0.0127 |
| pH | 3 | 3 | 3 | 3 | 1 | 1 | 6.13 |
| Drying method | $CO_2$ sc | stove | $CO_2$ sc | stove | $CO_2$ sc | stove | stove |

TABLE 2

| Organic gel | G0 | G0' | G1 | G2 | G3 | G4 | G5 |
|---|---|---|---|---|---|---|---|
| Density of the gel | 0.40 | 1 | 0.20 | 0.40 | 0.04 | 0.04 | 0.20 |
| Thermal conductivity of the gel (mW/mK) | 24 | — | — | 26 | — | 24 | — |

TABLE 3

| Porous carbon | C0 | C0' | C1 | C2 | C3 | C4 | C5 |
|---|---|---|---|---|---|---|---|
| Specific surface of the carbon (m²/g) | 983 | 18 | 1014 | 1080 | 769 | 1170 | 670 |
| Pore volume (cm³/g) of the carbon | 0.58 | 0.012 | 0.87 | 0.95 | 0.32 | 0.47 | 0.26 |
| Mean pore diameter (nm) of the carbon | 3.6 | — | 10 | 10 | 5.4 | 4.1 | 3.9 |
| Density of the carbon | 0.40 | 0.90 | 0.20 | 0.40 | 0.04 | 0.06 | 0.20 |
| Thermal conductivity (mW/mK) of the carbon | 30 | — | — | 33 | — | 29 | — |

The comparison of the C0 and C0' "control" porous carbons with those of the invention C1 to C5 clearly shows that the addition of the cationic polyelectrolyte P makes it possible to maintain, for a low density obtained, a nanometric structure even with stove drying (see the specific surface, pore volume and mean pore diameter values of the C2, C4 and C5 porous carbons, which are of the same order as those of C0), whereas, without this polyelectrolyte, the use of drying by supercritical C0, is necessary in order to retain this nanostructure of the C0 porous carbon.

Under these conditions, the densities of the nanostructured G1 to G5 gels and C1 to C5 carbons according to the invention are always less than or equal to 0.4.

By adjusting the pH to 1, these results also show that it is possible to obtain a material (see the G3 and G4 gels and the C3 and C4 carbons of the invention) with much lower densities (less than or equal to 0.06).

Finally, the results obtained for the G5 gel and the corresponding carbon C5 of the invention show that the synthesis can also be carried out in a less acidic and even slightly basic medium (pH>6).

TABLE 4

| Structure of the gel or of the carbon | G0" Silica aerogel* | G4 Gel | C4 Porous carbon |
|---|---|---|---|
| Density | 0.1* | 0.04 | 0.06 |
| Compression modulus (MPa) | 55* | 800 | 1050 |
| Breaking strength (MPa) | 4* | 25 | 20 |

*according to M. A. Aegerter et al., "Aerogel Handbook", Advances in Sol-Gel Derived Materials and Technologies, chap. 22.

This table 4 shows that the gels and porous carbons according to the invention exhibit mechanical properties which are very markedly improved in comparison with those of a known silica aerogel.

Thus, it is clearly seen that the flexible composite organic aerogel 1 according to the invention makes possible, owing to the fact that the organic aerogel 3 placed within the textile reinforcement 5 is a specific aerogel, a low thermal conductivity while being flexible and resistant, this being the case for a reasonable production cost owing to the fact that the specific organic aerogel does not require a supercritical drying stage.

The invention claimed is:
1. A flexible composite organic aerogel, comprising:
a textile reinforcement; and
an organic aerogel placed within the textile reinforcement,
wherein:
the organic aerogel is based on a resin resulting at least in part from at least one polyhydroxybenzene R and at least one formaldehyde F; and
the organic aerogel is:
  (i) a polymeric organic gel comprising at least one water-soluble cationic polyelectrolyte P, or
  (ii) the organic aerogel is a pyrolysate of the polymeric organic gel in the form of a porous carbon monolith comprising a product of pyrolysis of the at least one water-soluble cationic polyelectrolyte P,
wherein the at least one water-soluble cationic polyelectrolyte P is an organic polymer selected from the group consisting of a quaternary ammonium salt, a poly (vinylpyridinium chloride), a polyethyleneimine, a polyvinylpyridine, a poly(allylamine hydrochloride), a poly(trimethylammonioethyl methacrylate chloride), a poly(acrylamide-co-dimethylammonium chloride) and mixtures thereof; and
the organic aerogel exhibits a specific thermal conductivity of between 10 and 40 $mW·m^{-1}·K^{-1}$ at atmospheric pressure,
wherein the flexible composite organic aerogel comprises a product of a polymerization reaction in an aqueous solvent W of the at least one polyhydroxybenzene R and the at least one formaldehyde F, in the presence of the at least one water-soluble cationic polyelectrolyte P dissolved in the aqueous solvent W and in the presence of a catalyst, wherein the product of the polymerization reaction comprises the at least one water-soluble cationic polyelectrolyte P in a ratio by weight according to P/(R+F) of 2% to 10%, with respect to the at least one polyhydroxybenzene R and the at least one formaldehyde F, and wherein the organic aerogel has a density of between 0.01 and 0.4 g/cm$^3$.

2. The flexible composite organic aerogel of claim 1, wherein the at least one water-soluble cationic polyelectrolyte P is a salt comprising units resulting from a quaternary ammonium of a poly(diallyldimethylammonium halide).

3. The flexible composite organic aerogel of claim 1, wherein the product of the polymerization reaction comprises 0.2% to 2% mass fraction of the at least one water-soluble cationic polyelectrolyte P.

4. The flexible composite organic aerogel of claim 1, wherein the product of the polymerization reaction comprises the at least one water-soluble cationic polyelectrolyte P in a ratio by weight according to P/(R+F+W) ratio by weight of 0.3% to 2%, with respect to the polyhydroxybenzene R, the at least one formaldehyde R and the aqueous solvent W %.

5. The flexible composite organic aerogel of claim 1, wherein the organic aerogel further exhibits at least one of the following properties:
a specific surface of between 400 m$^2$/g and 1200 m$^2$/g;
a pore volume of between 0.1 cm$^3$/g and 3 cm$^3$/g;
a mean pore diameter of between 3 nm and 30 nm.

6. The flexible composite organic aerogel of claim 1, wherein, when the organic aerogel is the polymeric organic gel comprising the at least one water-soluble cationic polyelectrolyte P, the textile reinforcement is produced with organic fibers having a moisture uptake content of greater than or equal to 5% and having a chemical affinity for the said organic aerogel.

7. The flexible composite organic aerogel of claim 6, wherein the organic fibers or filaments of the textile reinforcement are selected from the group consisting of
a meta-aramid fiber,
an oxidized polyacrylonitrile fiber,
a polyamide-imide fiber,
a phenolic fiber,
a polybenzimidazole fiber, and
a polysulfonamide fiber.

8. The flexible composite organic aerogel of claim 6, wherein the textile reinforcement is a nonwoven textile.

9. The flexible composite organic aerogel of claim 6, wherein the textile reinforcement is a woven textile.

10. The flexible composite organic aerogel of claim 6, wherein the textile reinforcement is a textile in three dimensions.

11. The flexible composite organic aerogel of claim 1, wherein, when the organic aerogel is a pyrolysate in the form of a porous carbon monolith comprising the product of the pyrolysis of the at least one water-soluble cationic polyelectrolyte P, the textile reinforcement is produced with inorganic fibers which are resistant to the pyrolysis temperature.

12. The flexible composite organic aerogel of claim 11, wherein the inorganic fibers or filaments of the textile reinforcement are selected from the group consisting of
a glass fiber,
a basalt fiber,
a ceramic fiber,
a silica fiber, and
a silicon carbide fiber.

13. A process for manufacturing the flexible composite organic aerogel of claim 1, the process comprising:
a) polymerizing at least one polyhydroxybenzene R and at least one formaldehyde F in an aqueous solvent W, in the presence of at least one cationic polyelectrolyte P dissolved in the aqueous solvent W and in the presence of a catalyst, said polymerizing occurring within the textile reinforcement, to obtain a solution;
b) gelling the solution within the textile reinforcement in order to obtain a gel; and
c) drying of the textile reinforcement impregnated with the gel obtained in b) to obtain a dried gel,
wherein the at least one water-soluble cationic polyelectrolyte P is an organic polymer selected from the group consisting of a quaternary ammonium salt, a poly (vinylpyridinium chloride), a polyethyleneimine, a polyvinylpyridine, a poly(allylamine hydrochloride), a poly(trimethylammonioethyl methacrylate chloride), a poly(acrylamide-co-dimethylammonium chloride) and mixtures thereof,
wherein the at least one water-soluble cationic polyelectrolyte P is used
according to a P/(R+F) ratio by weight, with respect to the polyhydroxybenzene R and formaldehyde F, of between 2% and 10%.

14. The manufacturing process of claim 13, further comprising pyrolyzing the dried gel, in order to obtain a porous carbon.

15. The manufacturing process of claim 13, wherein:
the polymerizing a) occurs at ambient temperature, by dissolving the at least one polyhydroxylbenzene R and the at least one water-soluble cationic polyelectrolyte P in the aqueous solvent W, and then adding, to the solution, the at least one formaldehyde F and an acidic or basic catalyst, before pouring the solution over the textile reinforcement; and
the gelling b) occurs by curing impregnated textile reinforcement in an oven.

16. The manufacturing process of claim 13, wherein the drying c) occurs by drying with air in order to obtain a polymeric organic gel further exhibiting at least one of the following conditions:
a specific surface of between 400 m$^2$/g and 1200 m$^2$/g;
a pore volume of between 0.1 cm$^3$/g and 3 cm$^3$/g;
a mean pore diameter of between 3 nm and 30 nm.

* * * * *